March 9, 1943.  F. F. BIERLEE  2,313,215
INFLATION APPARATUS
Filed Oct. 20, 1941   2 Sheets-Sheet 1
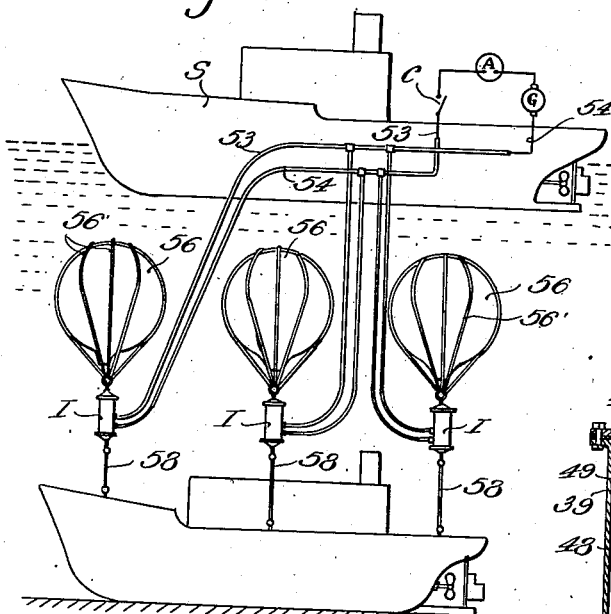
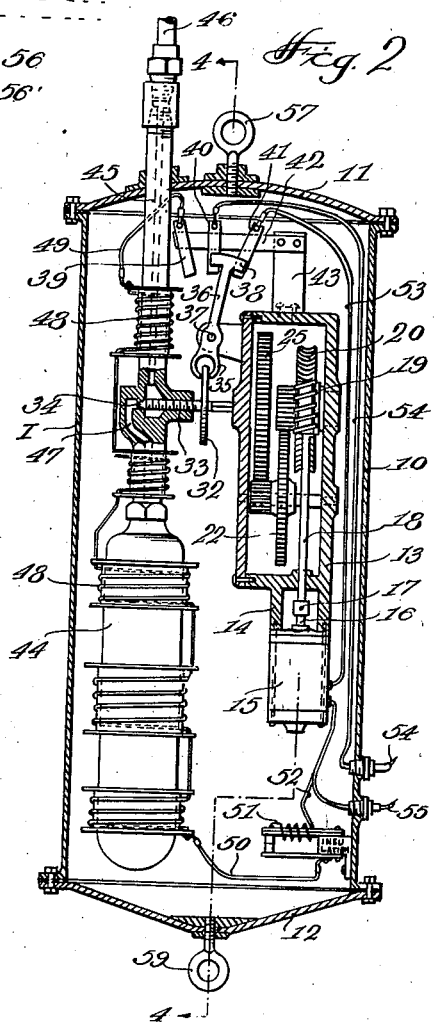
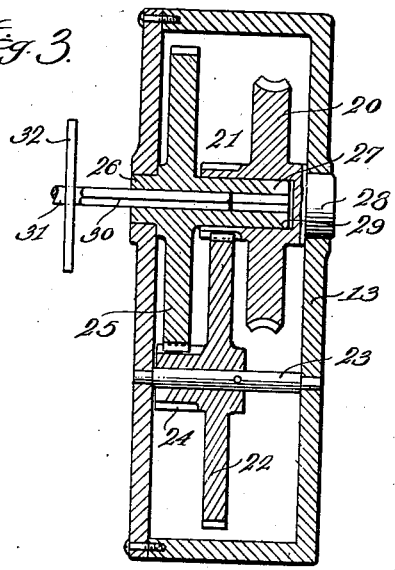
Frederik F Bierlee
INVENTOR
BY Victor J. Evans & Co.
ATTORNEYS March 9, 1943.  F. F. BIERLEE  2,313,215
INFLATION APPARATUS
Filed Oct. 20, 1941  2 Sheets-Sheet 2
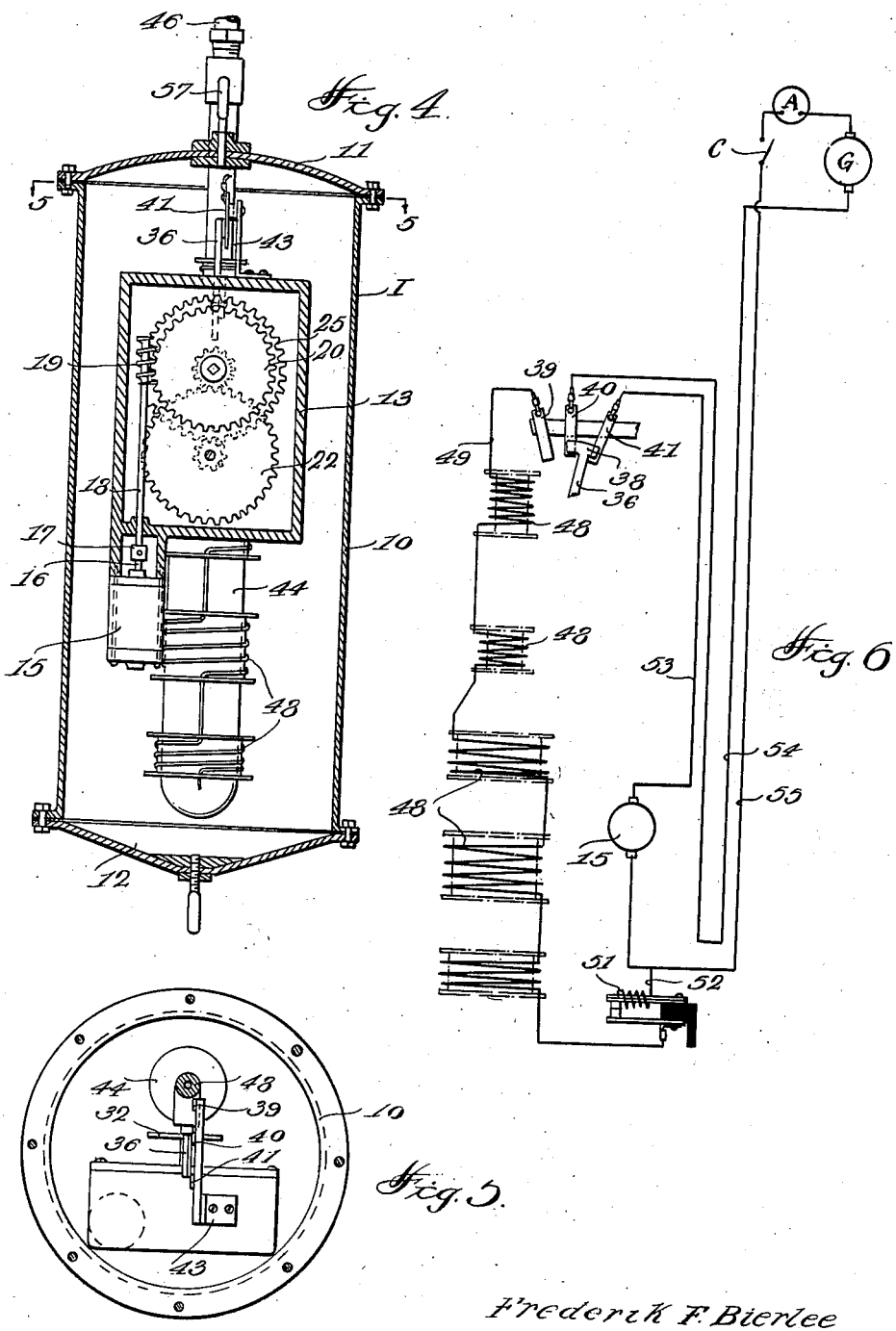
Frederick F. Bierlee
INVENTOR
BY Victor J. Evans & Co.
ATTORNEYS Patented Mar. 9, 1943

2,313,215

UNITED STATES PATENT OFFICE 2,313,215

INFLATION APPARATUS

Frederik F. Bierlee, Depasar, Bali, Netherland India; vested in the Alien Property Custodian Application October 20, 1941, Serial No. 415,835

7 Claims. (Cl. 114—54)

The present invention relates to improvements in inflation apparatus particularly adapted for raising sunken vessels and the like.

An object of the invention is to provide inflation apparatus of generally improved design.

Another object of the invention is the provision of inflation apparatus which can be electrically controlled from remote positions.

A further object of the invention is to provide an inflation apparatus which is compact in construction and reliable in operation.

Other objects and advantages of the invention will become apparent as the description progresses.

In the accompanying drawings forming a part of this specification and in which like numerals are employed to designate corresponding parts throughout;

Figure 1 is a side elevational view showing the improved apparatus applied to the raising of a sunken vessel, Figure 2 is a longitudinal section through an inflation unit, Figure 3 is an enlarged fragmentary section through a gear casing of the inflation unit, Figure 4 is a longitudinal section taken on line 4—4 of Figure 2, Figure 5 is a transverse section taken on line 5—5 of Figure 4, and Figure 6 is a diagrammatic view showing the electrical connections of the apparatus.

Referring to the drawings, wherein for the purpose of illustration is shown a preferred example of the invention, I generally designates an inflation unit embodying an elongated cylindrical body housing or shell 10 closed at the ends by heads 11 and 12. As shown at Figure 1 this housing structure is usually supported in approximately vertical position when attached to a sunken vessel.

Within the housing 10 is mounted a vertically supported gear casing 13 having a depending boss 14 to which is connected an electric motor 15 having a drive shaft 16 projecting upwardly therefrom and connected, by a coupling 17, with an upstanding extension shaft 18. This shaft 18 projects into the gear casing 13 and carries at its upper end a worm 19 supported to mesh with a worm wheel 20 journaled transversely in the upper portion of the casing and formed on a hub portion thereof with a spur pinion 21 disposed to mesh with a spur gear 22 supported on a shaft 23 journaled in the lower portion of the casing. On an extension hub of the gear 22 is formed a spur pinion 24 arranged to mesh with a relatively large spur gear 25. This latter gear is formed at one side with a relatively short hub extension 26 journaled in a bearing at one side of the casing and, at its opposite side, with a relatively long hub section 27 rotatably fitted in a socket in the hub of the gear 20, the latter having a stub shaft 28 at the outer side of the hub journaled in a bearing of the casing. Formed axially in the hub sections 26 and 27 of the gear 25 is a non-circular bore 29 designed to slidably accommodate therein the square shank 30 of a stem 31 disposed transversely of the casing and formed with a relatively large collar 32. The opposite end of the stem 31 is formed to provide a screw threaded portion 33 having a conical outer end 34 for a purpose which will be hereinafter described.

The collar 32 engages the opposed jaws of a yoke 35 formed at one end of a rocker arm 36 supported on a horizontal pivot 37. On the opposed end of this arm is provided an arcuate contact member 38 arranged to slidingly contact with three fixed contact bars 39, 40 and 41 fastened in a vertical plane and radially of the pivot 37 on an insulative arm 42 secured to an upstanding bracket 43 bolted or otherwise fastened on the gear casing.

Mounted in the lower portion of the housing 10 in longitudinally extending position is an elongated tank 44 having attached to the upper reduced neck portion an outlet conduit 45 projecting through a sealed opening in the top head 11 and connecting, outwardly of the housing, with a flexible tubular conduit 46. The intermediate portion of the conduit 45 is formed to provide a tortuous passage 47 shaped to afford therein a valve seat designed to assume valvular relation with the conical end 34 of the stem 31 for controlling the passage of fluid through the outlet conduit 45.

At longitudinally spaced intervals along the supply chamber 44 and the outlet conduit 45 are mounted a series of connected heating elements such as the resistance coils 48 designed so that those about the outlet conduit would have greater heating capacity. The upper terminal of this group of coils is connected, through the medium of a wire 49, with the end fixed switch contact 40 while the bottom terminal of the group is connected, through the medium of a conductor 50, with one terminal of an automatic regulating member such as the thermostat 51 which is, in turn, connected with a terminal of the electric motor 15 by a wire 52. The complementary terminal of the motor 15 is connected with the fixed contact member 41 through the medium of a conductor 53 while the center contact member 40 is connected with one side 54 of a main electric circuit. The opposite side wire of this main circuit, indicated at 55, connects with the conductor 52 as shown at Figure 2. The main circuit wires 54 and 55 are preferably covered by tubing or other suitable insulating covering and extend for connection with a master control switch C designed to be mounted at a position remote from the inflation apparatus, as for example on a surface salvage vessel S, in circuit with a source of electrical current such as the generator G and a current indicator as the ammeter A.

The conducting tube 46 coupled to the projecting end of the outlet conduit 45 makes communicative connection with a buoyant body which may be in the form of a rigid tank but in the present instance comprises a flexible or collapsible bag 56 of fabric or the like which attains an approximately spherical form when inflated. This bag is firmly attached to the housing of the inflating apparatus through the medium of a plurality of straps 56' which envelop the bag and connect with an eye 57 at the top of the housing. The housing I is attached to a submerged or sunken body by means of a cable 58 suitably fastened to the body and to an eye 59 at the bottom of the housing.

In use, one or more of the inflating and buoyant body units is attached to the submerged body to be raised as for example a submarine or a vessel, and is lowered from a salvage vessel S on the surface of the body of water. The number of inflation units employed will, of course, be dependent upon the flotation capacity thereof and the size of the vessel to be raised. When the units are properly fastened the master switch 55 on the surface vessel is closed to energize the circuit and initially operate the motor 15 which drives the reduction gearing and functions to open the control valve in the outlet conduit 45, unseating the conical end 34 of the valve stem from its seat in the passage 47. When the valve is fully opened the collar 34 acts to swing the switch arm 36 so that the arcuate contact element 38, which initially bridges the fixed contact strips 40 and 41 to close the motor circuit, now moves out of contact with the fixed strip 41 and bridges the center contact 40 with the end contact 39 to close the heating circuit and energizes the coils 48 to heat the chamber and the outlet conduit. This heating action serves to heat a condensed inflating fluid in the tank 44, as for instance liquefied carbon dioxide which, upon heating, is converted to gas and passes into the bag 56, the supply tank containing a charge of condensed fluid sufficient to fully inflate the bag. As the bag or bags become inflated the sunken vessel to which they are attached is raised to or adjacent the surface of the water through the medium of the ascensional force of the flotation bodies.

As will be apparent, this invention affords a relatively compact easily handled apparatus for raising sunken vessels and the like and enables accurate control from a station remote from the inflating mechanism.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In apparatus for inflating buoyant bodies, an inflation fluid containing chamber having a valve controlled outlet, an inflatable body connected to the outlet, means for heating the said chamber and outlet, and means for successively opening the valve and rendering the heating means operative.

2. In apparatus for inflating buoyant bodies, a supply chamber adapted to contain a buoyancy fluid, an outlet connecting the said chamber with a fluid receiver, a valve mounted in the outlet for controlling the passage of fluid from the chamber, means for heating the fluid in the chamber and outlet, and mechanism for successively opening the control valve and rendering the heating means operative to inflate the said receiver.

3. In inflation apparatus of the character described, a chamber adapted to contain condensed inflating fluid, a passage connecting the said chamber with an inflatable bag, a valve in the said passage for controlling the discharge of fluid from the chamber, electric elements for heating the fluid mounted on the chamber and passage, electrically driven mechanism for operating the valve, and a switch controlled electric circuit for opening the valve and energizing the said heating elements.

4. In inflation apparatus of the character described, a chamber adapted to contain condensed inflating fluid, a passage connecting the said chamber with an inflatable bag, a valve in the said passage for controlling the discharge of fluid from the chamber, electric elements for heating the fluid mounted on the chamber and passage, a train of gears for operating the valve, an electric motor for actuating the said gears, and an electric circuit connected with a manually operable switch, the motor and the heating elements for opening the valve and energizing the heating elements.

5. In inflation apparatus of the character described, a chamber adapted to contain condensed inflating fluid, a passage connecting the said chamber with an inflatable bag, a valve in the said passage for controlling the discharge of fluid from the chamber, electric elements for heating the fluid mounted on the chamber and passage, a train of gears for operating the valve, an electric motor for actuating the said gears, an automatic switch operable by said valve operating mechanism electrically connected with the motor and the heating elements, and an electric circuit connected with the said automatic switch, motor and heating elements for successively opening the valve and energizing the heating elements to inflate the bag.

6. In inflation apparatus of the character described, a housing, a tank mounted in the housing adapted to contain a charge of condensed inflating fluid, a conduit connected to the said tank projecting through the housing, an inflatable bag connected to the outer end of the conduit to receive the fluid from the tank, a valve in the conduit for controlling the discharge of fluid from the tank, and means mounted in association with the tank and conduit for heating the fluid therein.

7. In inflation apparatus of the character described, a housing, a tank mounted in the housing adapted to contain a charge of condensed inflating fluid, a conduit connected to the said tank projecting through the housing, an inflatable bag connected to the outer end of the conduit to receive the fluid from the tank, a valve in the conduit for controlling the discharge of fluid from the tank, means mounted in association with the tank and conduit for heating the fluid therein, and electrically controlled mechanism for opening the said valve.

FREDERIK F. BIERLEE.